United States Patent
Ranga et al.

(10) Patent No.: US 9,683,513 B2
(45) Date of Patent: Jun. 20, 2017

(54) METHODS AND SYSTEMS FOR LEARNING VARIABILITY OF A DIRECT FUEL INJECTOR

(71) Applicant: Ford Global Technologies, LLC, Dearborn, MI (US)

(72) Inventors: Adithya Pravarun Re Ranga, Canton, MI (US); Gopichandra Surnilla, West Bloomfield, MI (US); Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 14/556,615

(22) Filed: Dec. 1, 2014

(65) Prior Publication Data
US 2016/0153390 A1    Jun. 2, 2016

(51) Int. Cl.
| | | |
|---|---|---|
| *F02D 41/40* | (2006.01) | |
| *F02D 35/00* | (2006.01) | |
| *F02D 41/30* | (2006.01) | |
| *F02D 41/08* | (2006.01) | |
| *F02D 41/14* | (2006.01) | |
| *F02D 41/24* | (2006.01) | |
| *F02D 41/26* | (2006.01) | |

(52) U.S. Cl.
CPC ........... *F02D 41/402* (2013.01); *F02D 41/08* (2013.01); *F02D 41/1454* (2013.01); *F02D 41/2438* (2013.01); *F02D 41/2467* (2013.01); *F02D 41/26* (2013.01); *Y02T 10/44* (2013.01)

(58) Field of Classification Search
CPC .... F02D 41/402; F02D 41/403; F02D 41/405; F02D 41/08; F02D 41/1454; F02D 41/2438; F02D 41/2467; F02D 41/26
USPC ........ 701/101, 103, 104, 109; 123/299, 300, 123/295
See application file for complete search history.

(56) References Cited

U.S. PATENT DOCUMENTS

| | | | |
|---|---|---|---|
| 5,448,977 A | 9/1995 | Smith et al. | |
| 5,535,620 A * | 7/1996 | Nichols | F01N 11/00 701/105 |
| 5,642,722 A * | 7/1997 | Schumacher | F02D 41/047 123/480 |
| 6,065,449 A * | 5/2000 | Fukuma | F02D 41/3827 123/357 |
| 6,182,647 B1 * | 2/2001 | Hori | F02D 41/1455 123/674 |

(Continued)

OTHER PUBLICATIONS

Parotto, Marco et al., "Advanced GDI Injector Control with Extended Dynamic Range," SAE Technical Paper Series No. 2013-01-0258, published Apr. 8, 2013, 9 pages.

(Continued)

*Primary Examiner* — Hung Q Nguyen
*Assistant Examiner* — John Bailey
(74) *Attorney, Agent, or Firm* — Julia Voutyras; McCoy Russell LLP (57) ABSTRACT

Systems and methods for improving fuel injection of an engine that includes a cylinder receiving fuel from a direct fuel injector are disclosed. In one example, a transfer function or gain of a direct fuel injector is adjusted in response to an exhaust lambda value and a pulse width of a plurality of split fuel injections provided to an injector of the cylinder during a cylinder cycle.

19 Claims, 4 Drawing Sheets

(56) References Cited

U.S. PATENT DOCUMENTS

| | | | |
|---|---|---|---|
| 6,244,241 B1* | 6/2001 | Mamiya | F02D 41/2461 123/295 |
| 6,701,905 B1 | 3/2004 | Gaskins | |
| 7,841,319 B2* | 11/2010 | Thomas | F02D 41/2438 123/478 |
| 8,239,119 B2 | 8/2012 | Bagnasco et al. | |
| 8,290,687 B2 | 10/2012 | Olbrich et al. | |
| 8,700,288 B2 | 4/2014 | Huber et al. | |
| 8,838,365 B2* | 9/2014 | Glugla | F02D 41/3094 123/305 |
| 2004/0154591 A1* | 8/2004 | Shinzawa | F02D 19/0628 123/406.47 |
| 2005/0087169 A1* | 4/2005 | Yoshida | F02D 41/065 123/299 |
| 2006/0005804 A1* | 1/2006 | Kuo | F02D 13/0207 123/295 |
| 2006/0011180 A1* | 1/2006 | Sasaki | F01N 3/0814 123/698 |
| 2007/0015630 A1* | 1/2007 | Miyazaki | F02D 41/0225 477/111 |
| 2007/0119424 A1* | 5/2007 | Leone | F02D 19/0692 123/461 |
| 2007/0174003 A1* | 7/2007 | Ueno | F02D 41/0002 701/104 |
| 2008/0110438 A1* | 5/2008 | Ashizawa | F02B 23/104 123/478 |
| 2008/0228378 A1* | 9/2008 | Kohler | F02D 41/064 701/103 |
| 2008/0264155 A1* | 10/2008 | Achleitner | F02D 41/221 73/114.42 |
| 2009/0007888 A1* | 1/2009 | Sarlashkar | F02D 35/026 123/478 |
| 2009/0038583 A1* | 2/2009 | Gwidt | F02D 41/0245 123/299 |
| 2009/0082946 A1* | 3/2009 | Ishizuka | F02D 41/1498 701/106 |
| 2009/0132145 A1* | 5/2009 | Angeby | F02D 35/02 701/102 |
| 2009/0204311 A1* | 8/2009 | Aliakbarzadeh | F02D 41/0085 701/103 |
| 2010/0132435 A1* | 6/2010 | Doring | F02D 19/0628 73/28.04 |
| 2010/0217505 A1* | 8/2010 | Kawamura | F02D 35/02 701/108 |
| 2010/0241341 A1* | 9/2010 | Yun | F02B 1/12 701/113 |
| 2011/0184629 A1* | 7/2011 | Krengel | F02D 19/061 701/103 |
| 2011/0213544 A1* | 9/2011 | Mitsuda | F02D 41/2441 701/103 |
| 2011/0295488 A1* | 12/2011 | Ramappan | F02D 41/2467 701/103 |
| 2011/0320107 A1* | 12/2011 | Katsurahara | F02D 41/1454 701/104 |
| 2012/0006107 A1* | 1/2012 | Azadeh | F02D 41/008 73/114.31 |
| 2012/0041668 A1* | 2/2012 | Ruggiano | F02D 41/1402 701/104 |
| 2012/0089318 A1* | 4/2012 | Ruggiano | F02D 41/0002 701/103 |
| 2012/0123703 A1* | 5/2012 | Serra | F02D 41/2432 702/47 |
| 2013/0317723 A1* | 11/2013 | Deubler | F02D 41/0085 701/104 |
| 2013/0332051 A1* | 12/2013 | Wolk | F02D 41/0255 701/104 |
| 2013/0340719 A1* | 12/2013 | Gutscher | F02D 41/3094 123/478 |
| 2014/0251272 A1* | 9/2014 | Moonjelly | F02M 65/00 123/435 |
| 2014/0330504 A1* | 11/2014 | Nistler | F02D 41/3005 701/104 |
| 2016/0053702 A1* | 2/2016 | Nada | F02D 41/403 123/294 |

OTHER PUBLICATIONS

Ranga, Adithya Pravarun Re et al., "Methods and Systems for Adjusting Fuel Injector Operation," U.S. Appl. No. 14/556,752, filed Dec. 1, 2014, 33 pages.

Ranga, Adithya Pravarun Re et al., "Methods and Systems for Adjusting a Direct Fuel Injector," U.S. Appl. No. 14/556,821, filed Dec. 1, 2014, 33 pages.

Ranga, Adithya Pravarun Re et al., "Methods and Systems for Adjusting a Direct Fuel Injector," U.S. Appl. No. 14/556,674, filed Dec. 1, 2014, 40 pages.

\* cited by examiner

METHODS AND SYSTEMS FOR LEARNING VARIABILITY OF A DIRECT FUEL INJECTOR

FIELD

The present description relates to a system and methods for adjusting operation of a fuel injector for an internal combustion engine.

BACKGROUND AND SUMMARY

Internal combustion engines may utilize direct fuel injection, wherein fuel is directly injected in to an engine cylinder to improve combustion mixture preparation and to reduce cylinder charge temperatures. An amount of time a direct fuel injector is activated may be a function of fuel pressure supplied to the injector, engine speed and engine load. Therefore, at higher pressures, a fuel pulse width supplied to the injector may be adjusted to a short duration of time (e.g., less than 500 micro-seconds). However, operating the fuel injector with short pulse widths may cause the injector to operate in a non-linear or ballistic region where the amount of fuel injected may vary substantially for small changes in the fuel pulse width. For example, the direct fuel injector may deliver less fuel than desired in the ballistic region where shorter pulse widths are applied to the fuel injector. Further, the variability in the ballistic region may not show a linear trend. Also, fuel injectors delivering fuel to the cylinder often have piece-to-piece and time-to-time variability, due to imperfect manufacturing processes and/or injector aging (e.g., clogging), for example. Consequently, injector variability may cause cylinder torque output imbalance due to the different amount of fuel injected into each cylinder, and may also cause higher tail pipe emission and reduced fuel economy due to an inability to correctly meter the fuel to be injected into each cylinder. For at least these reasons, it may be desirable to re-characterize fuel injector flow, in particular in the ballistic operating region, during a life cycle of the engine.

The inventors herein have recognized the above-mentioned disadvantages and have developed a method for a cylinder, comprising: splitting injection of a fuel amount into a plurality of injections during a cylinder cycle in response to a request to characterize a control parameter of a fuel injector delivering fuel to the cylinder; adjusting the control parameter based on an exhaust lambda value; and operating the fuel injector based on the adjusted control parameter.

By splitting a fuel injection amount into a plurality of split fuel injections during a cylinder cycle, it may be possible to provide the technical result of learning a fuel injector transfer function or gain without having to operate the cylinder with an engine air-fuel ratio that may be leaner or richer than is desired. In particular, a pulse width supplied to the fuel injector to deliver each of the plurality of split fuel injections may be adjusted to be short enough in duration to operate the fuel injector in its non-linear low flow region. A correction factor for adjusting the fuel injector transfer function or gain may be determined based on an engine lambda value determined at an exhaust gas oxygen sensor. For example, as the number of fuel injections increase, the pulse width of each split fuel injection during the cylinder cycle decreases. Consequently, if fuel supplied by the fuel injector in response to the pulse width is less than a desired amount, the transfer function correction factor may be determined based on a change in lambda value from a nominal lambda value observed during a nominal single fuel injection. In this way, by splitting the fuel injection into multiple split fuel injections and measuring the engine lambda signal, it may be possible to characterize the fuel injector in the non-linear region while operating the engine at the desired air-fuel ratio.

The present description may provide several advantages. In particular, the approach may reduce engine air-fuel errors. Additionally, the approach may allow a fuel injector to be operated at pulse widths that were heretofore avoided because of non-linear fuel injector behavior, thereby extending the range of injector operation. Further, the approach may reduce engine emissions and improve catalyst efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
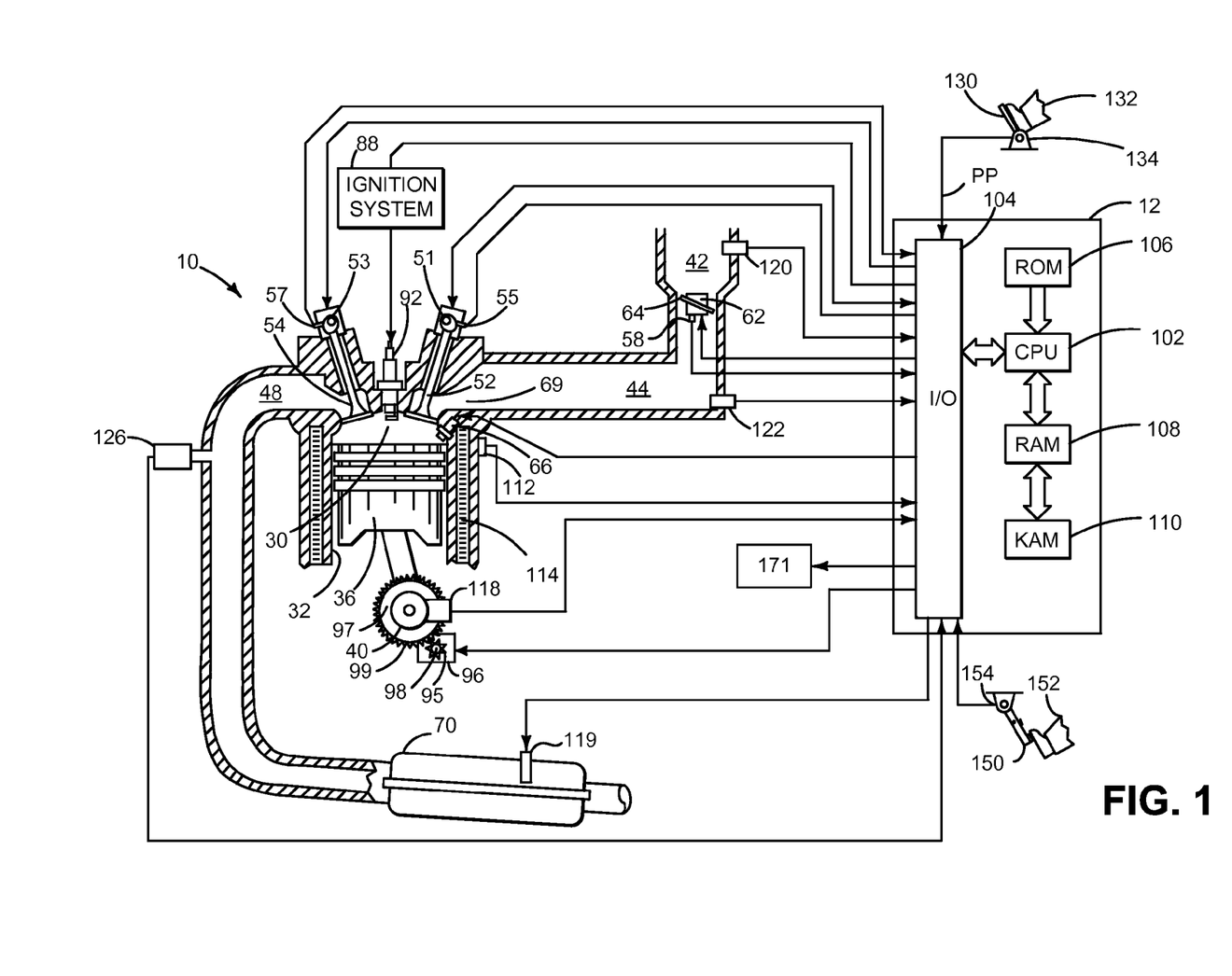
FIG. 1 is a schematic diagram of an engine.
Figure 3:
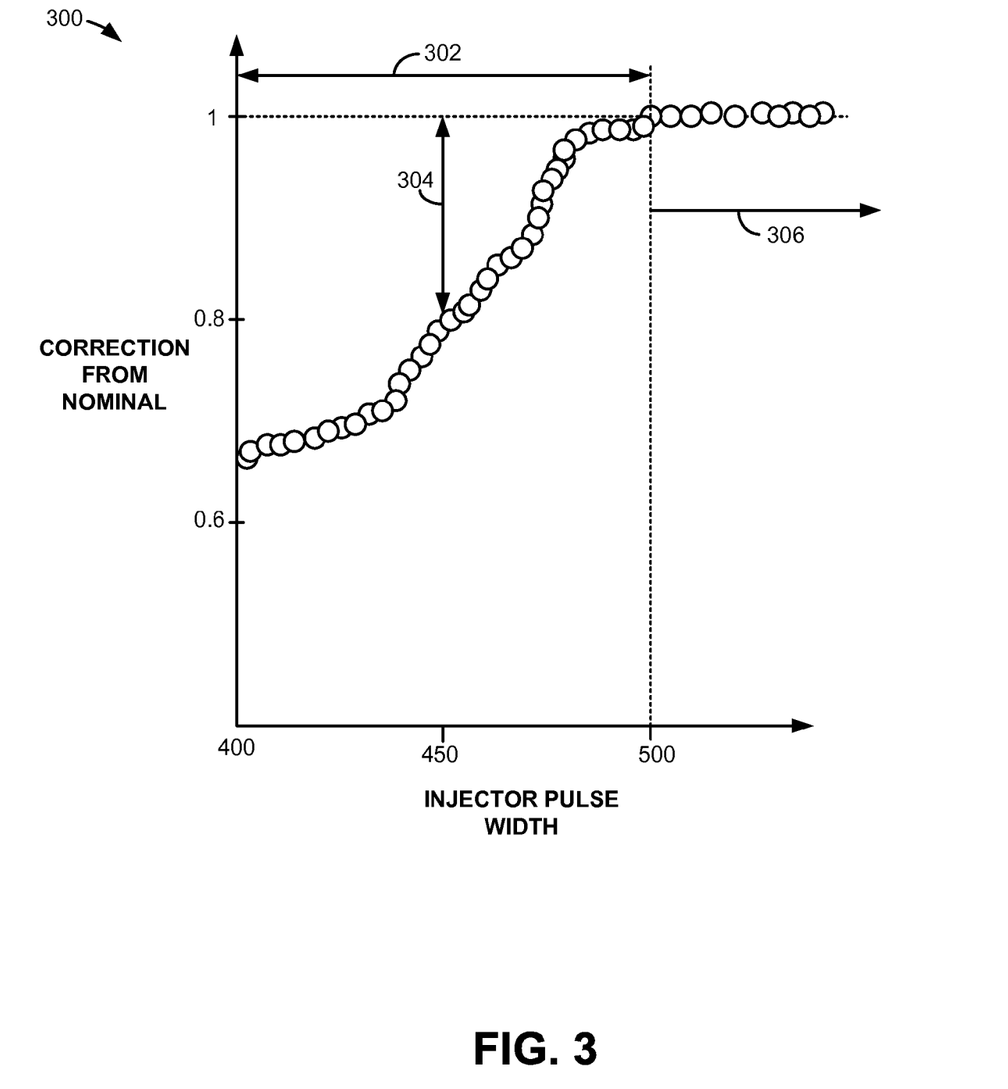
FIG. 3 shows a prophetic example plot of engine lambda versus fuel injector pulse width for a fuel injector operating in its ballistic operating region.
Figure 4:
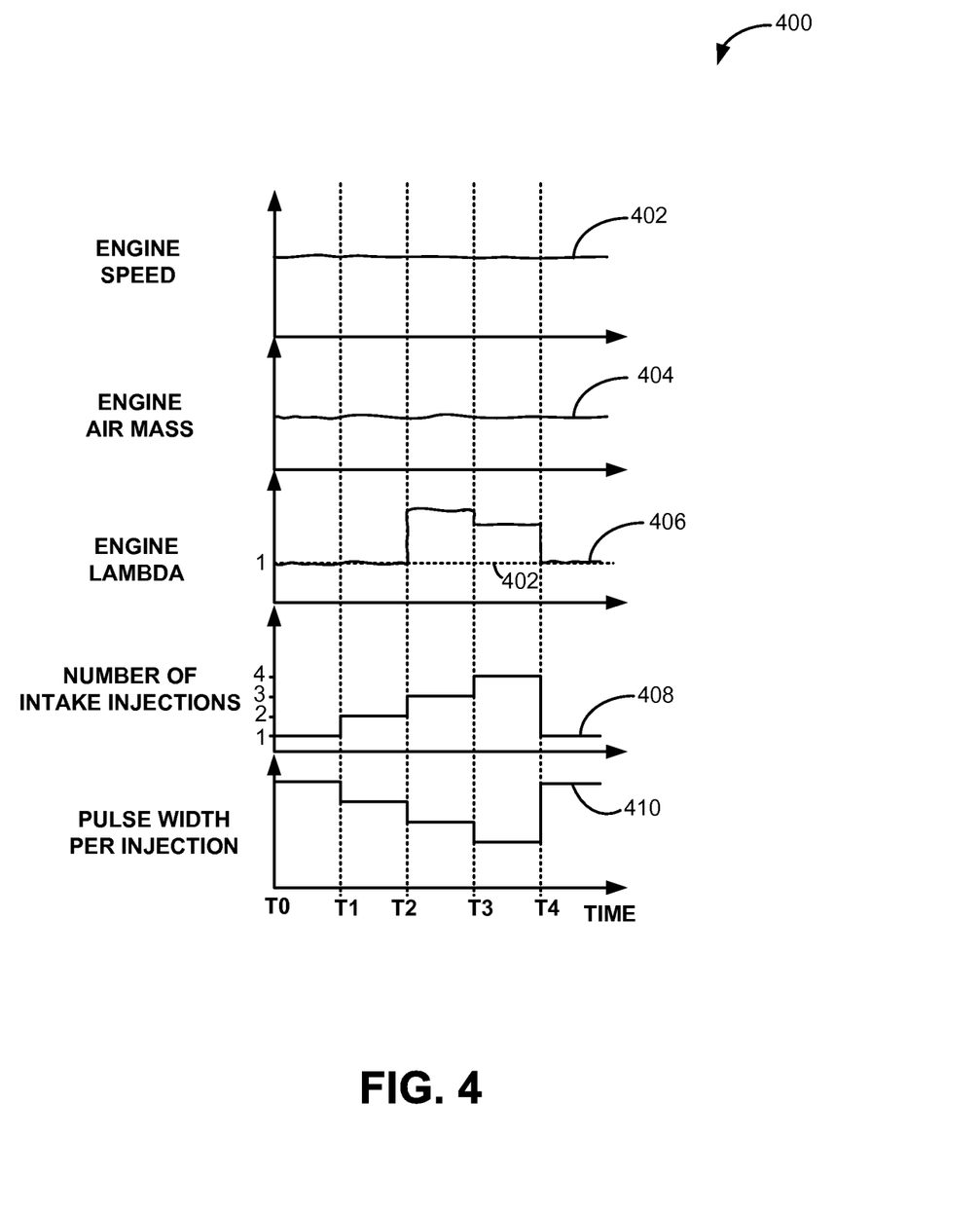
FIG. 4 shows a fuel injector operating sequence for adjusting fuel injector operation according to the method of FIG. 2.

The present description is related to updating a fuel injector transfer function and operating fuel injectors based on the updated fuel injector transfer function. Fuel injectors may be incorporated into an engine as is shown in FIG. 1. The engine may be operated according to the method of FIG. 2 to update one or more fuel injector transfer functions. A fuel injector transfer function may be revised in a fuel injector's non-linear operating region based on engine lambda as is shown in FIG. 3. An engine may be operated as shown in the sequence of FIG. 4 according to the method of FIG. 2 to revise a fuel injector's transfer function.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown).

A fuel injector transfer function that describes fuel injector flow or that describes an amount of fuel injected by the direct fuel injector based on a fuel injector pulse width may be characterized during a life cycle of the engine as described herein in order to reduce injector variability. For example, an amount of fuel injected by the fuel injector may be less than or greater than desired. In particular, in injector operating regions of low pulse width, there may be a significant difference between a desired fuel injection amount and the actual fuel injection amount. Further, the variability in the low pulse width region (also referred to herein as the ballistic region) may not be linear. Therefore, it may be desirable to characterize fuel injector flow variability. The variability in the non-linear low flow regions may be learned by splitting a given fuel injection into a plurality of split fuel injections such that each pulse width for delivering the split fuel injection operates the injector in the non-linear operating region while maintaining a desired engine air-fuel ratio. An engine lambda value measured during split fuel injections may be compared to a nominal lambda value obtained during single nominal fuel injection, and a fuel injector transfer function may be adjusted based on the change in lambda value from nominal and the number of split fuel injections. Details of learning fuel injector variability transfer function will be further described herein with respect to FIGS. 2-4.

It must be appreciated that while the examples discussed herein describe learning fuel injector transfer function in an engine equipped with direct fuel injection, similar methods may be employed in determining direct injector variability in an engine system equipped with a port fuel injection system and the direct fuel injection system. As such, fuel is supplied to direct fuel injector 66 at a higher pressure than fuel is supplied to a port fuel injector (not shown), the port fuel injector delivering fuel into an intake port of the cylinder.

In addition, intake manifold 44 is shown communicating with optional electronic throttle 62 which adjusts a position of throttle plate 64 to control air flow from air intake 42 to intake manifold 44.

In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system, comprising: an engine including a cylinder; a direct fuel injector in fluidic communication with the cylinder; and a controller including executable instructions stored in non-transitory memory for commanding the engine to operate at a constant air-fuel ratio while supplying fuel to the cylinder the direct fuel injector, and additional instructions for providing a plurality of injections of fuel via the direct fuel injector in response to a request to adjust a control parameter of the fuel injector. The control parameter may be a gain or a transfer function.

In some examples, the system further comprises additional instructions to adjust the number of injections delivered by the fuel injector in response to the request to adjust the control parameter. The transfer function or gain may be adjusted based on an exhaust lambda.

Figure 2:
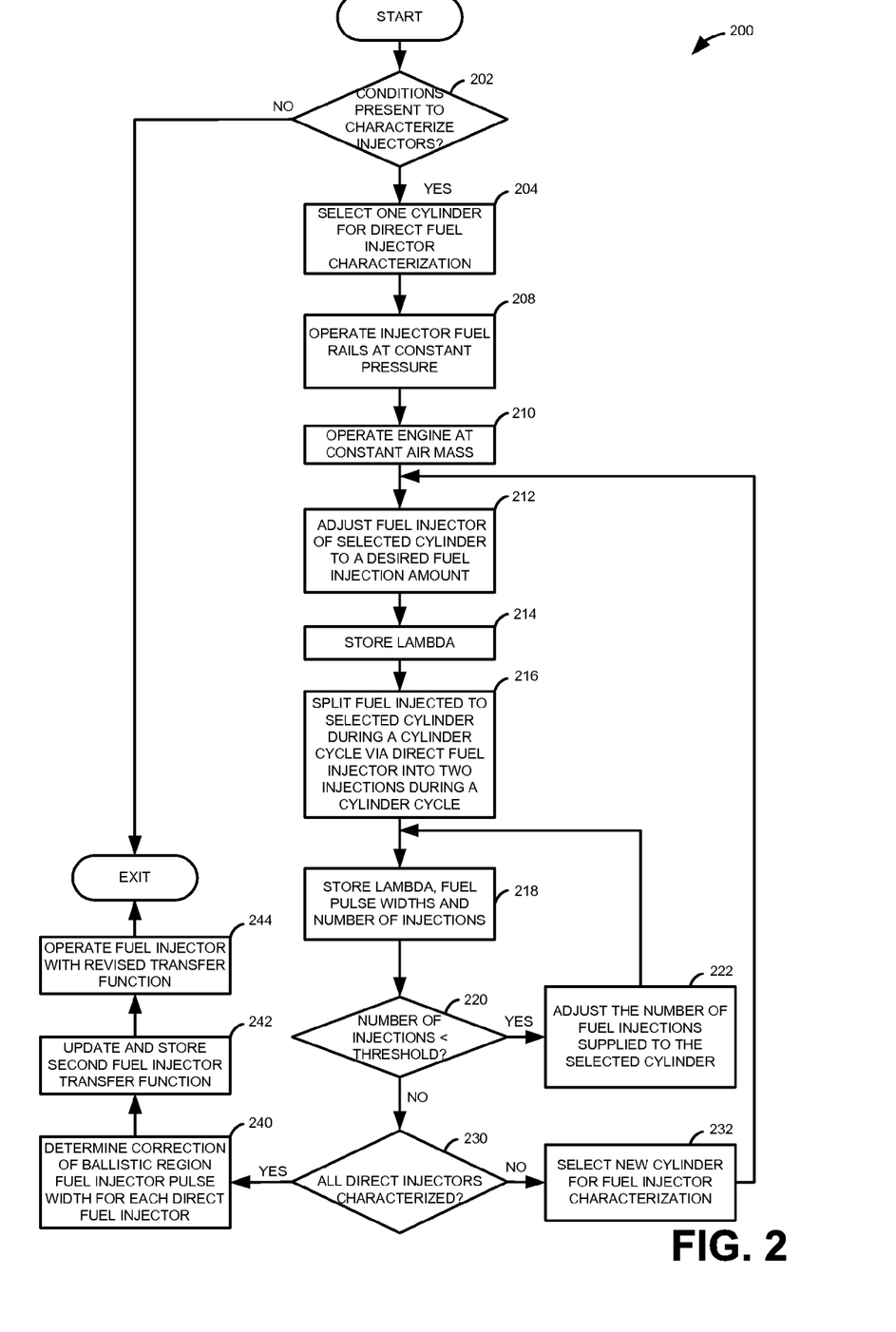
FIG. 2 shows a method for adjusting fuel injector operation.

Referring now to FIG. 2, a method for adjusting a fuel injector transfer function and operating an engine based on the adjusted transfer function is shown. The method of FIG. 2 may be included in the system of FIG. 1 as executable instructions stored in non-transitory memory. Further, the method of FIG. 2 may provide the operating sequence of FIG. 4.

At 202, method 200 judges if conditions are present for characterizing fuel injectors and adapting fuel injector operation. In one example, method 200 may judge that conditions are present for characterizing fuel injectors when an engine is idling with zero driver demand torque. In other examples, method 200 may judge that conditions are present for characterizing fuel injectors when the engine is operating at a constant engine speed and load, such as when a vehicle is in cruise control mode on a flat road. Further still, fuel injector characterization may be initiated if a threshold duration has elapsed since a last characterization of the fuel injectors. If method 200 judges that conditions are present for characterizing fuel injectors, the answer is yes and method 200 proceeds to 204.

At 204, method 200 selects one cylinder from a group of engine cylinders for direct fuel injector characterization. In other words, a direct fuel injector of a cylinder is selected to determine if the direct fuel injector transfer function accurately describes direct fuel injector operation or fuel flow. The direct fuel injector's gain or transfer function describes fuel flow through the direct fuel injector and/or an amount of fuel delivered via the direct fuel injector based on a pulse width of a voltage supplied to the direct fuel injector. In one example, method 200 begins by selecting a direct fuel injector of cylinder number one. However, in other examples, other cylinders may be selected. Method 200 proceeds to 208 after the cylinder is selected.

At 208, method 200 supplies fuel to direct fuel injector rails at a constant pressure. By supplying fuel to the fuel rails at a constant pressure, it may be possible to more accurately characterize fuel injector fuel flow rate and amount of fuel injected. Method 200 proceeds to 210 after fuel at constant pressure is supplied to the fuel rails.

At 210, method 200 operates the engine with a constant air mass. The engine may be operated with a constant air mass via adjusting a position of a throttle or other air control device as engine speed changes. If engine speed remains constant, the position of the air mass adjusting device may remain unchanged. The constant air mass may be a predetermined amount such as an air amount to idle the engine or an air amount to maintain a constant vehicle speed at present vehicle operating conditions. By operating the engine with a constant air mass, it may be possible to ascertain fuel injector fuel delivery errors more accurately since the engine's air-fuel ratio may be less likely to change from air charge errors. Method 200 proceeds to 212 after beginning to operate the engine with a constant air mass.

At 212, method 200 adjusts the direct fuel injector supplying fuel to the selected cylinder to deliver a desired fuel amount in a single fuel injection. The desired fuel amount is an amount of fuel delivered to the cylinder during a cylinder cycle of the selected cylinder in order to obtain a desired engine air-fuel ratio. In one example, the desired engine air-fuel ratio is at stoichiometry. As such the single fuel injection may be delivered during an intake stroke of the cylinder cycle. Method 200 proceeds to 214 after the desired fuel amount is selected and applied.

At 214, method 200 determines the lambda value the engine is operating at based on output from an exhaust gas oxygen sensor (e.g. UEGO sensor). The lambda value is the engine's present air-fuel ratio divided by the stoichiometric air fuel ratio (e.g., 14.3/14.64=0.977). The oxygen sensor outputs a voltage that is converted to engine air-fuel ratio via an oxygen sensor transfer function. The present value of lambda is stored to controller memory. Additionally, the pulse width of a voltage supplied to the direct fuel injector may also be stored to memory. Method 200 proceeds to 216 after the lambda value is stored to memory.

At 216, method 200 splits the desired amount of fuel injected to the selected cylinder via the direct fuel injector into two split fuel injections during a cycle of the selected cylinder. The two injections are provided during an intake stroke of the cylinder cycle by supplying the direct fuel injector two voltage pulse widths or injection pulse widths. For example, the direct fuel injector may be supplied with a first pulse width for delivering a first amount of fuel, and with a second pulse width for delivering a second amount of fuel. The first amount of fuel injected based on the first pulse width may be equal to the second amount of fuel injected based on the second pulse width. Further, the amount of fuel commanded in the two pulse widths may add up to a total amount of fuel that when combined with the selected cylinder's air amount provides a lambda value of one in the selected cylinder. For example, if X grams of fuel are needed to operate the selected cylinder at a lambda value of one, the amount of fuel injected by the direct fuel injector may be a first amount 0.5·X, and a second amount 0.5·X, when the first fuel injection amount provided by the first pulse width is equal to the second fuel injection amount provided by the second pulse width. Thus, the amount of fuel injected based on the first pulse width supplied to the direct fuel injector is fifty percent of the total fuel injected by the direct fuel injector during the cylinder cycle. The amount of fuel injected based on the second pulse width supplied to the direct fuel injector is also fifty percent of the total fuel injected by the direct fuel injector during the cylinder cycle. Method 200 proceeds to 218 after the first and second pulse widths provided to the direct fuel injector of the selected cylinder are adjusted to a predetermined split of fuel delivered between the two pulse widths.

At 218, method 200 determines the lambda value the engine is operating at based on output from the exhaust gas oxygen sensor. The lambda value is the engine's present air-fuel ratio divided by the stoichiometric air fuel ratio. The oxygen sensor outputs a voltage that is converted to engine air-fuel ratio via an oxygen sensor transfer function. The present value of lambda is stored to controller memory. Additionally, the direct fuel injector's two pulse widths and a number of injections (e.g. two) may also be stored to memory. Errors between the direct fuel injector's pulse width for delivering the desired engine air-fuel ratio and the lambda value observed by the exhaust oxygen sensor may be indications of errors in the direct fuel injector's transfer function in the direct fuel injector's ballistic operating region. For example, when the error includes a higher engine air-fuel ratio than desired (that is, less fuel is delivered than requested), the updated transfer function may be increased. In another example, when the error includes a lower engine air-fuel ratio than desired (that is, more fuel is delivered than requested), the updated transfer function may be decreased. As such, injector pulse widths that are greater than a pulse width that operates the direct fuel injector in a linear mode are expected to have a smaller effect on lambda errors. Method 200 proceeds to 220 after the lambda value is stored to memory.

At 220, method 200 judges if a number of split fuel injections supplied by the direct fuel injector during a cylinder cycle is less than a threshold number. In one example, the threshold number may be a predetermined value, such as four.

In some examples, additionally or alternatively, the method may judge if an $n^{th}$ pulse width of the split fuel injections supplied to the direct fuel injector is at a minimum desired pulse width, where n may be 1, 2, or any number less than or equal to the threshold number. In some other examples, the minimum pulse width may be a predetermined value such as 100 micro seconds. The minimum pulse width is a pulse width that operates the direct fuel injector in its non-linear or ballistic operating region where fuel flow through the direct fuel injector is non-linear.

If method 200 judges that the number of split fuel injections supplied by the fuel injector is not less than the threshold number, method 200 proceeds to 230. Otherwise, the answer is yes and method 200 proceeds to 222.

At 222, method 200 adjusts the number of split fuel injections provided by the fuel injector to deliver the desired amount of fuel during a cycle of the selected cylinder. For example, the number of split fuel injections to deliver the desired amount of fuel during a cylinder cycle may be incremented by one. As an example, if, during a previous cylinder cycle, the desired amount of fuel injected into the cylinder is delivered via two fuel injections, the desired amount of fuel for a current cylinder cycle may be delivered via three fuel injections. That is, the desired amount of fuel delivered into the cylinder during the current cylinder cycle may be split into three fuel injections. In one example, a total amount of fuel delivered by the split fuel injections during the cylinder cycle adds up to an amount of fuel that when combined with the selected cylinder's air amount is based on providing a lambda value of one in the selected cylinder.

Further, each split fuel injection may be delivered during an intake stroke of a cylinder cycle, and each split fuel injection may deliver the same amount of fuel. That is, fuel delivery may be split into multiple symmetric split fuel injections. For example, when the number of fuel injections is three, the direct fuel injector may be supplied with a first pulse width for delivering a first amount of fuel, a second pulse width for delivering a second amount of fuel, and a third pulse width for delivering a third amount of fuel, wherein each of the first, second and third amounts correspond to one-third of the total fuel mass delivered to the cylinder on the cylinder cycle. After the first pulse width is delivered to the direct fuel injector, the second pulse width is supplied to the fuel injector during the same cylinder cycle. After the second pulse-width is delivered to the direct fuel injector, a third pulse width is delivered to the injector during the same cylinder cycle. In one example, the first pulse width, the second pulse width, and the third pulse width may be adjusted to deliver the same fuel amount. That is, each pulse width supplied to the injector during each fuel injection in a cylinder cycle may be adjusted to deliver the same fuel amount. Consequently, as the number of fuel injections for delivering the desired fuel injection amount increase during a cylinder cycle, an amount of fuel delivered during each split-injection decreases. Therefore, the pulse-width delivered to the direct fuel injector for each split-fuel injection also decreases.

By increasing the number of split fuel injections during each cylinder cycle, the fuel injector pulse width may be decreased and consequently, the direct fuel injector may be gradually driven to operate closer to or deeper into a non-linear operating range of the direct fuel injector. In this way, by increasing the number of fuel injections over consecutive fueling cycles of a cylinder, the direct fuel injector may be driven into its non-linear operating range in a way that reduces engine fueling errors yet provides the ability to determine fuel injector fueling errors. Method 200 returns to 218 to record the effects of adjusting the number of fuel injections and the fuel pulse widths applied to the direct fuel injector of the selected cylinder.

Returning to 220, if method 200 judges that the number of split fuel injections is not less than the threshold number, method 200 may proceed to 230. That is, if a threshold number of injection (e.g. four) for characterizing the injector is reached, the method may proceed to 230. At 230, method 200 judges whether or not operation of all the engine's direct fuel injectors have been characterized. If operation of all direct fuel injectors has not been characterized, the answer is no and method 200 proceeds to 232. Otherwise, the answer is yes and method 200 proceeds to 240.

At 232, method 200 selects a new cylinder from the cylinders that have not had their direct fuel injectors characterized. For example, if cylinder number one has had its direct fuel injector supplying fuel characterized, cylinder number two is selected. In some examples, the sequence of cylinders selected for characterization may be based on the firing order. For example, in an in-line 4 cylinder engine with cylinders 1-4 having a firing order of 1-3-4-2, after cylinder 1 has been characterized, cylinder 3 may be characterized. Additionally, the previously selected cylinder may resume operation in a normal mode without split-fuel injection. That is, the desired amount of fuel may be delivered in one single intake stroke fuel injection. Method 200 returns to 212 after a new cylinder is selected for fuel injector characterization.

At 240, upon characterizing all the fuel injectors, method 200 determines corrections for ballistic or non-linear regions of direct fuel injectors of all engine cylinders. The corrections are made to nominal pulse widths (e.g., existing transfer function values) of the fuel injector at the pulse widths the fuel injector operated at in steps 218 to 222 during the time the fuel injection split ratio was adjusted. In one example, the fuel pulse width correction is determined as a function of the engine lambda value at the pulse width, and a number of pulse widths. For example, the fuel pulse width correction may be described as:

$$\text{Total \% reduction} = f(\text{\% change\_in\_lambda\_from\_nom}, \text{num\_cylinders\_per\_bank}, \text{num\_of\_split\_injections})$$

where Total % reduction is the correction applied to the transfer function of the direct fuel injector of the selected cylinder at a particular direct fuel injector pulse width, % change_in_lambda_from_nom is the percent change in the observed lambda value for the complete bank at the particular pulse width from the lambda value of the bank at the fuel pulse width applied when the direct fuel injector is supplied fuel based on the initial pulse width (e.g., lambda value at 214), num_cylinders_per_bank is the number of cylinders per bank (e.g. a V6 engine may have 3 cylinders per bank, and an I4 engine may have 4 cylinders in one bank), and num_of_split_injections is the number of split injections. The correction may be determined for and applied to all direct fuel injectors of the selected cylinders based on lambda values and pulse widths stored at 218.

For example, at a particular pulse width, a lambda lean value indicates reduction in fueling and hence the updated transfer function may be increased. As an example, during nominal engine operation without split fuel injection, the nominal lambda value may be 1.01. When operating with two split fuel injections, each at 450 micro seconds, for example, the lambda value may increase to 1.12. The increase in lambda value indicates a reduction in fueling when the injector is operated at 450 micro seconds. A percentage reduction in fueling may be determined as:

$$\text{Total \% reduction} = 100 * \frac{(\text{change\_in\_lambda\_from\_nom} * \text{num\_cylinders\_per\_bank})}{\text{num\_of\_split\_injections}}$$

Accordingly, for a V6 engine, when the injector is operated at 450 microseconds, the reduction in fueling is 16.5% (100*(1.12−1.01)*3/2). Therefore, the transfer function may be increased such that at 450 micro seconds, the injector may deliver 16.5% more fuel in order to run the engine at stoichiometry. Similarly, during split-fuel injections, if the injector operating at a pulse-width shows a decrease in lambda value (as a result of increased fueling at the operated pulse-width), the updated transfer function may be decreased.

The, the corrections may be applied to all direct fuel injectors of all engine cylinders. Method 200 performs similar adjustments to the direct fuel injector's transfer function at all pulse widths the direct fuel injector was operated at between steps 218 and 222.

At 242, the values stored in a table or function that represents the transfer function of the direct fuel injector are adjusted by multiplying values stored in the transfer function by the corresponding injector correction determined at 240 and updating the result back into the direct fuel injector transfer function table. For example, if the direct fuel injector transfer function describes the direct fuel injector's flow at the 400 micro-second pulse width as Z, and the correction determined at 240 for the 400 micro-second pulse width is 5%, the adjusted value stored in the direct fuel injector's transfer function is 0.05·Z. Adjustments for when the direct fuel injector is provided pulse widths other than 400 micro-seconds are also performed for each decrement in fuel pulse width performed at 222. Likewise, adjustments for transfer functions of other cylinder's direct fuel injectors may be performed similarly. In cases where a single transfer function describes operation of all the engine's cylinders direct fuel injectors, the single transfer function is adjusted similarly. Method 200 stores the revised transfer function or functions in memory and proceeds to 244.

At 244, method 200 operates the engine via supplying fuel to engine cylinders based on the adjusted and updated direct fuel injector transfer functions. For example, pulse widths are provided to each engine cylinder's direct fuel injector, the pulse widths based on a desired fuel mass to be delivered to a cylinder during a cycle of the cylinder and the transfer function that outputs a fuel injector pulse width according to a desired mass of fuel to be injected to the cylinder. Method 200 proceeds to exit after engine cylinders are operated in response to one or more revised direct fuel injector transfer functions.

Consequently, the method of FIG. 2 provides for a method for fueling a cylinder, comprising: splitting injection of a fuel amount into a plurality of injections during a cylinder cycle in response to a request to characterize a control parameter of a fuel injector delivering fuel to the cylinder; adjusting the control parameter based on an exhaust lambda value; and operating the fuel injector based on the adjusted control parameter, wherein each pulse width supplied to the injector for delivering each of the plurality of injections operates the injector in a non-linear operating region, and wherein the non-linear operating region is an operating region where fuel flow through the fuel injector is non-linear.

The method further includes splitting the fuel amount based on delivering an equal split fuel amount during each of the plurality of injections, wherein the control parameter is a fuel injector gain or a fuel injector transfer function and the adjusted control parameter is stored to memory. The method further includes the fuel injector being a direct fuel injector, wherein the plurality of injections are based on providing an engine lambda value of one, and wherein in response to the request to characterize the control parameter of the injector, the fuel injector is operated at a constant rail pressure while the engine including the cylinder is operated at a constant speed and air mass.

Referring now to FIG. 3, an example plot of a fuel injector correction amount versus fuel injector pulse width for a fuel injector operating in a non-linear or ballistic region is shown. The fuel injectors shown in FIG. 1 may operate similar to the way shown in FIG. 3.

The X axis represents fuel injector pulse width. A fuel injector pulse width may vary in duration from zero to tens of milliseconds. The Y axis represents a fuel flow correction from a nominal fuel injector flow rate. A nominal correction has a value of 1. When the fuel injector flow is less than nominal, the correction factor is a fraction of nominal (e.g., 0.8). The correction may be applied as one divide by 0.8 (that is, 1/0.8). When the fuel injector flow is more than the nominal, the correction factor may be more than 1 (e.g., 1.1). The circles represent individual data values for different fuel injector pulse widths.

In this example, the fuel injector begins to operate in a non-linear or ballistic range when fuel pulse widths are less than about 500 micro seconds (0.5 milli seconds) microseconds. This range is indicated by leader 302. At higher or longer pulse widths, the fuel injector flow is a nominal amount as indicated by the value of one when fuel injector pulse widths are greater than 500 micro seconds (0.5 milli seconds) micro-seconds. This range is indicated by leader 306. When the fuel injector described by plot 300 is operated with a 450 micro-second pulse width, fuel injector flow is about 80 percent of nominal fuel injector flow rate as indicated by leader 304, which indicates that as in the injector is operated in the low pulse width region the amount of fueling decreases by a greater extent than what it is expected. Thus, the fuel flow rate of this particular fuel injector is decreased (prior to applying the correction) when the fuel injector is supplied a 450 micro-second injection pulse. That is, at 450 micro-second the fueling is 80% compared to the nominal (100%) for the particular injector.

This indicates that when a fuel flow of 1 is requested for the injector at 450 micro-second, the actual delivery by the injector is 0.8. Hence the correction factor is 0.8 and a 1/correction factor (that is, 1/0.8=1.25) times fuel may be applied to operate the injector at nominal flow of 1.

The correction factor is reduced further in response to fuel injector pulse widths that are less than 500 micro-seconds. At fuel injector pulse widths greater than 500 micro seconds, the correction from nominal is one (e.g., no correction). The fuel injector's nominal flow rate may be multiplied by the correction to provide the injector's fuel flow rate when a particular pulse width is applied to the fuel injector.

A plurality of correction values shown in FIG. 3 may be stored in a table or function as a transfer function for a fuel injector. The correction values may be adjusted or updated according to the method of FIG. 2. Thus, it may be possible to describe fuel injector flow in a fuel injector's ballistic operating range where the fuel injector may exhibit non-linear flow.

Referring now to FIG. 4, a fuel injector operating sequence for adjusting fuel injection according to the method of FIG. 2 is shown. Vertical markers T1-T6 represent times of interest during the sequence. FIG. 4 illustrates example engine speed at plot 402, engine air mass at plot 404, engine lambda at plot 406, number of fuel injections at plot 410, and pulse width per injection at plot 412. In all the plots discussed at FIG. 4, the X axis represents time and time increases from the left side of the plot to the right side of the plot.

The first plot from the top of FIG. 4 is a plot of engine speed versus time. The Y axis represents engine speed and engine speed increases in the direction of the Y axis arrow.

The second plot from the top of FIG. 4 is a plot of engine air mass versus time. The Y axis represents engine air mass (e.g., air flow through the engine) and engine air mass increases in the direction of the Y axis arrow.

The third plot from the top of FIG. 4 is a plot of engine lambda versus time. The Y axis represents engine lambda and engine lambda increases in the direction of the Y axis arrow.

The fourth plot from the top of FIG. 4 is a plot of a number of intake split-fuel injections supplied by the direct fuel injector of the selected cylinder during a cycle of the selected cylinder versus time. The Y axis represents the number of fuel injections and the number of fuel injections increases in the direction of the Y axis arrow.

The fifth plot from the top of FIG. 4 is a plot of a pulse width supplied to a direct fuel injector of a selected cylinder during a cycle of the selected cylinder versus time. The Y axis represents the fuel pulse width and the fuel pulse width increases in the direction of the Y axis arrow.

At time T0, the engine is operating at a constant engine speed with a constant air mass. The engine lambda value is one (e.g., the desired lambda value). Only one fuel pulse width is supplied to the direct fuel injector during the cylinder cycle. That is, a single fuel injection (without split fuel injection) may be performed. The engine lambda value obtained during the single fuel injection may be a nominal lambda value.

At time T1, the engine speed and air mass remain at their respective constant values. The number of intake fuel injections is incremented to two in response to a request to characterize the direct fuel injector. The first pulse width is equal to the second pulse width, and each pulse width is longer than a pulse width for entering the direct fuel injector's ballistic operating region where fuel injector flow is non-linear. Consequently, the engine lambda value is steady at a value of one. The engine lambda value, the direct fuel injector pulse widths, and the number of injections are stored to memory a short time after time T1 and before time T2.

At time T2, the engine speed and air mass continue to remain at their respective constant values. The number of fuel injections is incremented to three in response to the number of fuel injections being less than a threshold number (in this example, the threshold number may be four). As the number of split fuel injections in increased, the pulse-width of each split fuel injection is decreased. Consequently, the first, the second, and the third pulse-widths are short enough for the direct fuel injector to enter a non-linear or ballistic operating mode where fuel flow through the direct fuel injector may be non-linear. The engine lambda value increases indicating that the fuel injector pulse width is not supplying a desired amount of fuel and the fuel injector is in the ballistic region. The increased lambda value indicates that the direct fuel injector transfer function is providing a fuel pulse to the direct fuel injector resulting in a leaner air-fuel ratio than desired. The engine lambda value, the direct fuel injector pulse widths, and the number of fuel injections are stored to memory a short time after time T2 and before time T3.

At time T3, the engine speed and air mass continue to remain at their respective constant values. The number of fuel injections supplied to the selected cylinder is increased further in response to the number of fuel injections being less than a threshold number. The fuel pulse width of each split injection drives the direct fuel injector to operate deeper in the direct fuel injector's non-linear operating region. The engine lambda value decreases a small amount but remains above the nominal. The higher lambda value from nominal indicates that the direct fuel injector transfer function is providing a fuel pulse to the direct fuel injector resulting in a leaner air-fuel ratio than desired. The engine lambda value, the direct fuel injector pulse widths, and the number of pulse widths are stored to memory a short time after time T3 and before time T4.

At time T4, the engine speed and air mass continue to remain at their respective constant values. The direct fuel injector is operated only based on a single pulse width providing the desired fuel amount during the cylinder's cycle in response to the number of fuel injections being less than a threshold number. The lambda value converges back to a value of one. The direct fuel injector pulse width is a value that operates the direct fuel injector in a linear region that is outside of the ballistic region. After time T4, the direct fuel injector transfer function may be adjusted to improve the transfer functions characterization of direct fuel injector operation. In one example, the entries in the direct fuel injection transfer function may be adjusted by multiplying present values in the direct injector transfer function by a correction value that is based on the change in engine lambda from a nominal value and number of fuel injections as is described in the method of FIG. 2. The direct fuel injectors may be subsequently operated based on the revised transfer function.

It must be appreciated that while the examples discussed herein describe learning fuel injector transfer function in an engine equipped with direct fuel injection, similar methods may be employed in determining direct injector variability in an engine system equipped with a port fuel injection system and a direct fuel injection system. For example, a first fuel fraction may be supplied to a cylinder of the engine via a first port fuel injector while supplying a second fuel fraction to the cylinder via a second direct fuel injector. Further, a plurality of split fuel injections may be supplied to the direct fuel injector during a cylinder cycle in response to a request to characterize the direct fuel injector. A control parameter (e.g. a transfer function or gain) of the direct fuel injector may be adjusted based on an exhaust lambda value produced while the direct fuel injector is delivering the split fuel injections and is operating in a non-linear region, and the direct fuel injector may be operated based on the adjusted control parameter.

In one example, a method for a cylinder may comprise: operating an engine including the cylinder at a constant speed and air mass; in response to a request to characterize a fuel injector fueling the cylinder, operating the injector to deliver a number of split fuel injections during a cylinder cycle, wherein a pulse width supplied to the injector for delivering each split fuel injection operates the injector in a non-linear region; adjusting a control parameter of the fuel injector based on an engine lambda value produced while the fuel injector is operating in the non-linear region, and the number of split fuel injections; and operating the fuel injector based on the adjusted control parameter. Herein the fuel injector is a direct fuel injector; the control parameter is a transfer function or gain, wherein during the cylinder cycle, each pulse width is supplied to the injector to deliver a constant split fuel amount. The method may further comprise sequentially increasing the number of injections per cylinder cycle during each subsequent cylinder cycle until a threshold number of split injections is reached, and may include decreasing the pulse width for each split injection during each cylinder cycle as the number of injections per cylinder cycle increases.

The method may further include a total amount of fuel delivered via the number of injections being based on providing a mixture in the cylinder having a lambda value of one during a cylinder cycle. Further the method may include commanding the engine to operate at a constant air-fuel ratio while operating at the constant speed and air mass, and operating a fuel rail supplying fuel to the injector at a constant rail pressure in response to the request to characterize the fuel injector. Still further, the method may include any two split fuel injections during a cylinder cycle being separated by a minimum crank angle degree.

In another example, a method for a cylinder including a direct fuel injector may comprise: during a learning condition, comparing a first UEGO output of a single nominal fuel injection and a second UEGO output of a plurality of split fuel injections to learn a fuel injector variability transfer function for the fuel injector fueling the cylinder; and adjusting a fuel injector parameter based on the transfer function; wherein the fuel injector parameter is a fuel injector gain. The method may further include a pulse width supplied to the injector during each of the plurality of split fuel injections operating the injector in a ballistic region, and may further include operating the fuel rail supplying the injector at a constant rail pressure and operating an engine including the cylinder at a constant speed and air mass.

In this way, by splitting fuel injection into multiple fuel injections, varying the number of injections, and comparing the engine lambda value during split fuel injections to the nominal lambda value determined during single fuel injection, the correction factor for learning injector variability in the non-linear ballistic injector operating region may be determined, and the fuel injector transfer function may be adjusted based on the correction factor. By adjusting the fuel injector transfer function based on the correction factor, fuel injector variability in the non-linear region may be reduced. Consequently, the range of injector operation may be extended, allowing the fuel injector to be operated at pulse widths that were avoided because of non-linear fuel injector behavior. Further, by reducing variability in the non-linear region, engine air-fuel errors may be reduced. As a result, engine emissions may be reduced and catalyst efficiency may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a cylinder, comprising:
splitting injection of a fuel amount into a plurality of injections during a cycle of the cylinder in response to a request to correct operation of a fuel injector delivering fuel to the cylinder;
adjusting a fuel flow parameter of the fuel injector based on an exhaust lambda value and an actual total number of fuel injections during the cycle of the cylinder; and
operating the fuel injector based on the fuel flow parameter.

2. The method of claim 1, further comprising incrementing the plurality of injections over two or more cylinder cycles until a predetermined number of fuel injections is reached in response to the request to correct operation of the fuel injector and adjusting the fuel flow for each time the plurality of injections is incremented in response to the request to correct operation of the fuel injector.

3. The method of claim 1, wherein splitting the fuel amount is based on delivering an equal split fuel amount during each of the plurality of injections.

4. The method of claim 1, wherein the fuel flow parameter is a fuel injector gain or a fuel injector transfer function.

5. The method of claim 1, wherein the adjusted fuel flow parameter is stored to memory.

6. The method of claim 1, wherein the fuel injector is a direct fuel injector, and wherein the plurality of injections are based on providing an engine lambda value of one.

7. The method of claim 1, wherein, in response to the request to correct operation of the fuel injector, the fuel injector is operated at a constant rail pressure and an engine including the cylinder is operated at a constant speed and air mass.

8. A method for a cylinder, comprising:
operating an engine including the cylinder at a constant speed and air mass;
in response to a request to correct operation of a fuel injector fueling the cylinder, operating the injector to deliver a number of split fuel injections during a cylinder cycle, wherein a pulse width supplied to the injector for delivering each split fuel injection operates the injector in a non-linear region;
adjusting a control parameter of the fuel injector based on an engine lambda value and an actual total number of fuel injections during the cylinder cycle produced while the fuel injector is operating in the non-linear region; and
operating the fuel injector based on the adjusted control parameter.

9. The method of claim 8, wherein the fuel injector is a direct fuel injector, and wherein the control parameter is a transfer function or gain.

10. The method of claim 9, wherein during the cylinder cycle, each pulse width is supplied to the injector to deliver a constant split fuel amount.

11. The method of claim 10, further comprising sequentially increasing the number of injections per cylinder cycle during each subsequent cylinder cycle until a threshold number of split injections is reached in response to the request to correct operation of the fuel injector.

12. The method of claim 11, further comprising decreasing the pulse width for each split injection during each cylinder cycle as the number of injections per cylinder cycle increases.

13. The method of claim 12, wherein a total amount of fuel delivered via the number of injections is based on providing a mixture in the cylinder having a lambda value of one during the cylinder cycle.

14. The method of claim 8, further comprising commanding the engine to operate at a constant air-fuel ratio while operating at the constant speed and air mass.

15. The method of claim 8, further comprising operating a fuel rail supplying fuel to the injector at a constant rail pressure in response to the request to correct operation of the fuel injector.

16. The method of claim 9, wherein any two split fuel injections during a cylinder cycle is separated by a minimum crank angle degree.

17. A method for a cylinder including a direct fuel injector, comprising:
during a learning condition, comparing a first UEGO output of a single nominal fuel injection and a second UEGO output of a plurality of split fuel injections, a result of the comparison divided by an actual total number of fuel injections during a cylinder cycle to determine a change in fueling;
learning a fuel injector variability transfer function for the fuel injector fueling the cylinder from the change in fueling; and
adjusting a fuel injector parameter based on the transfer function;
wherein the fuel injector parameter is a fuel injector gain.

18. The method of claim 17, wherein a pulse width supplied to the injector during each of the plurality of split fuel injections operates the injector in a ballistic region, and further comprising:
incrementing the actual total number of fuel injections for each cylinder cycle until a predetermined number of injections is reached for each cylinder cycle in response to a request to correct operation of the fuel injector.

19. The method of claim 18, further comprising operating a fuel rail supplying the injector at a constant rail pressure and operating an engine including the cylinder at a constant speed and air mass.

* * * * *